A. L. PUTNAM.
METALLIC VEHICLE WHEEL.
APPLICATION FILED JULY 12, 1915.
1,175,990.
Patented Mar. 21, 1916.
2 SHEETS—SHEET 1.
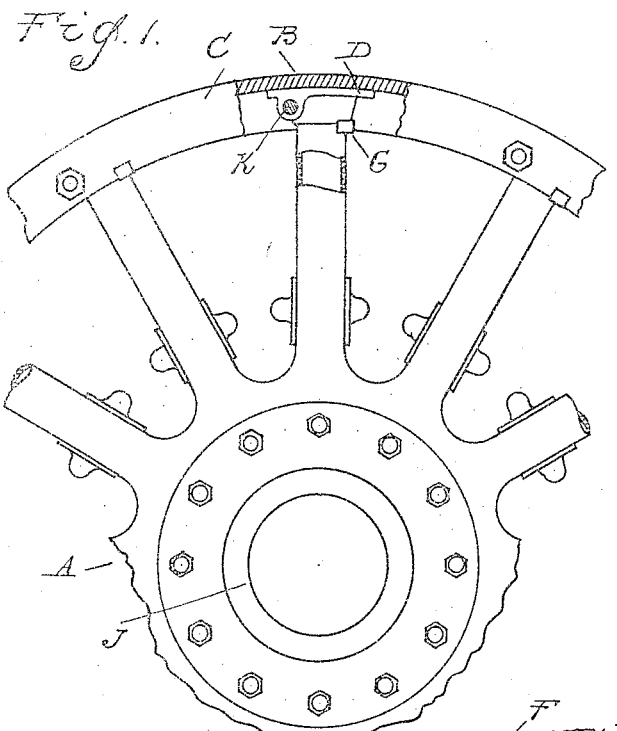
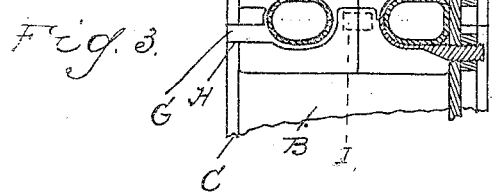
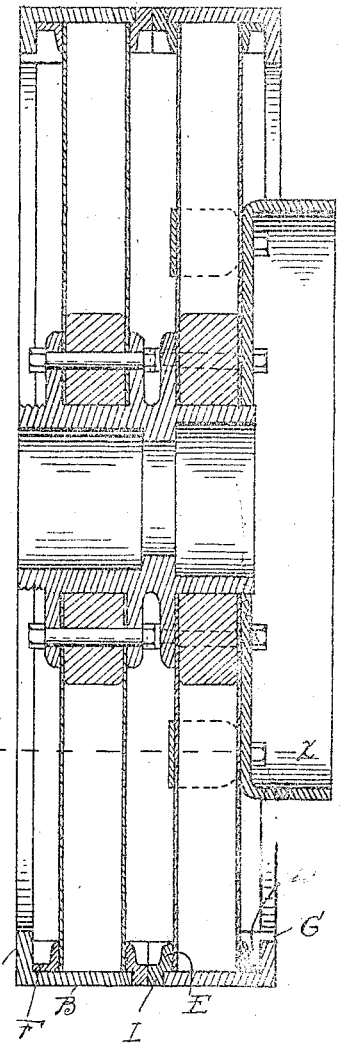
Inventor
Alden L. Putnam
By Whittemore Hulbert & Whittemore
Attorneys

A. L. PUTNAM.
METALLIC VEHICLE WHEEL.
APPLICATION FILED JULY 12, 1915.

1,175,990.

Patented Mar. 21, 1916.
2 SHEETS—SHEET 2.

Inventor
Alden L. Putnam

By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC VEHICLE-WHEEL.

1,175,990.  Specification of Letters Patent.  Patented Mar. 21, 1916.

Application filed July 12, 1915. Serial No. 39,459.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels and more particularly to that type known as twin wheels.

It is the object of the invention to obtain a construction employing pressed sheet metal spiders and channel-section rims, the construction being one which permits of readily assembling and securing the parts.

Figure 5:
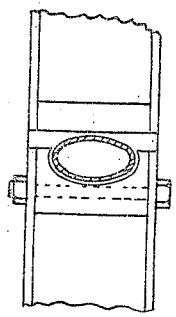
Figure 4:
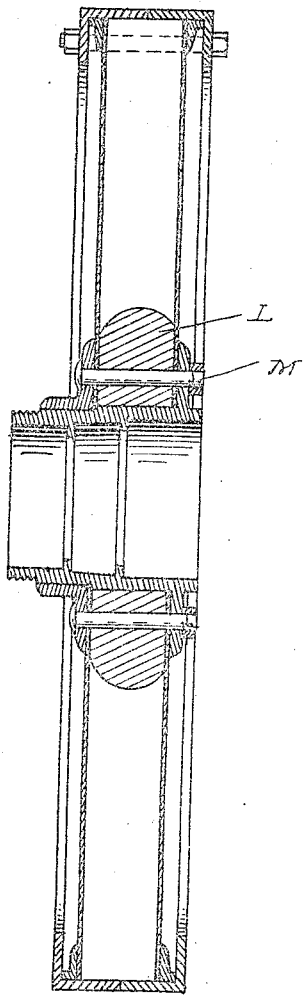

In the drawings: Figure 1 is a sectional side elevation of the wheel; Fig. 2 is a cross section thereof; Fig. 3 is a section on line $x$—$x$; Fig. 4 is a modified construction as applied to a single wheel; and Fig. 5 is a cross-section thereof.

A is the spider section, which is formed of complementary pressed sheet metal sections, together constituting a series of radially-extending tubular spokes united by a common hollow center.

B is a metallic rim, having inwardly-extending flanges C on opposite sides thereof forming a channel cross section.

To secure the spider within the rim it is necessary that the spokes should extend radially to the peripheral portion of the rim, but the inwardly-extending flanges, if integrally formed, would prevent the assembling of the parts. On the other hand, to secure the reinforcing and strengthening effect of the flange it is important that it should be integral with that portion of the rim to which the ends of the spokes are secured. I have therefore formed the rim B of two complementary sections abutting against each other in the central plane of the wheel. This, in case of a twin wheel construction, permits of slipping the peripheral portion of the rim over the ends of the spokes of each spider section without interference from the flange which is on the outside of the rim. The spokes and rim are interlocked by fittings D, preferably forgings, which have socket portions E for engaging the ends of the spokes, and segmental flange portions F for fitting within the rim. Laterally-extending lugs G on these fittings engaging apertures H in the flanges C, and outwardly-extending lugs I engaging apertures in the rim B, will serve to interlock against relative movement under the torque of the wheel.

The inner ends of the spiders A are clamped to a common hub J, while at their outer ends the spiders and rim sections are clamped together by bolts K, preferably passing through alined apertures in the fittings D and the flanges C. Thus when the parts are assembled, the twin sections of the wheel are interlocked with each other, and with their respective spiders, while the inwardly-extending flanges C on both sides of the wheel form a strong reinforcement for the rim.

In the modified construction shown in Fig. 4 a single wheel, instead of a twin wheel, is formed, the rim being split in the central plane of the spokes, and the two sections being interlocked with the spider by fittings L and clamping bolts M.

What I claim as my invention is:—

1. A metallic vehicle wheel, comprising a spider section, a rim section of channel cross section having inwardly-extending flanges upon the opposite sides thereof, and a peripheral portion for fitting over the ends of the spokes of the spider, said rim being divided for assembling on said spider, and fittings for interlocking said spokes with said rim sections laterally engageable therewith.

2. A metallic vehicle wheel, comprising a spider section having radially-extending spokes and a rim of channel cross section having inwardly-extending flanges on opposite sides thereof and a peripheral portion for fitting about said spokes, said rim being divided centrally of the peripheral portion thereof to permit of engaging said spider from opposite sides, and socket fittings engaging the spokes of said spider having lugs interlocking with apertures in said rim and laterally engageable therewith.

3. A metallic vehicle wheel, comprising a spider section having radial spokes, and a rim of channel cross section having inwardly-extending flanges and a peripheral portion for fitting about the spokes of the spider, said rim being divided centrally of the peripheral portion for engagement with said spider from opposite sides thereof, and socket fittings for engagement with the ends of the spokes and fitting within the peripheral portion of said rim, said fittings having laterally-extending lugs for engaging apertures in the inwardly-extending flanges of the rim, and outwardly-extending lugs for engaging notches in the peripheral portion of the rim, and clamping bolts for securing said rim sections and fittings to said spider.

4. A metallic vehicle wheel, comprising a spider section having radially-extending spokes, a rim of channel cross section having inwardly-extending flanges on the opposite sides of said spider and a peripheral portion for fitting over the ends of said spokes, said rim being divided centrally of the peripheral portion for engagement from opposite sides of said spider, socket fittings for engaging the ends of the spokes fitting within the peripheral portion of said rim and having laterally-extending lugs for engaging apertures in said inwardly-extending flanges, and outwardly-extending lugs for engaging notches in said peripheral portions, and clamping bolts passing through said inwardly-extending flanges and registering apertures in said fittings.

5. A twin metallic vehicle wheel, comprising twin spider sections having radially-extending spokes, twin rim sections each having a peripheral portion for fitting about said spokes and an inwardly-extending flange portion, socket fittings engaging the ends of said spokes having laterally-extending lugs engaging apertures in said inwardly-extending rim, and outwardly-extending lugs engaging notches in the peripheral portion of said rim, a common hub for uniting said spider sections, and clamping bolts for securing said rim sections to each other.

In testimony whereof I affix my signature in presence of two witnesses.

ALDEN L. PUTNAM.

Witnesses:
JAMES P. BARRY,
PHYLLIS COBURN.